(12) United States Patent
Pohl et al.

(10) Patent No.: US 12,313,435 B2
(45) Date of Patent: May 27, 2025

(54) METHOD FOR OPERATING A CORIOLIS MEASUREMENT DEVICE

(71) Applicant: Endress+Hauser Flowtec AG, Reinach (CH)

(72) Inventors: Johan Pohl, Freiburg (DE); Hao Zhu, Freising (DE)

(73) Assignee: Endress+Hauser Flowtec AG, Reinach (CH)

( * ) Notice: Subject to any disclaimer, the term of this patent is extended or adjusted under 35 U.S.C. 154(b) by 351 days.

(21) Appl. No.: 17/995,176

(22) PCT Filed: Mar. 8, 2021

(86) PCT No.: PCT/EP2021/055738
§ 371 (c)(1),
(2) Date: Sep. 30, 2022

(87) PCT Pub. No.: WO2021/197764
PCT Pub. Date: Oct. 7, 2021

(65) Prior Publication Data
US 2023/0168115 A1 Jun. 1, 2023

(30) Foreign Application Priority Data
Mar. 31, 2020 (DE) ..................... 10 2020 108 849.3

(51) Int. Cl.
*G01F 1/84* (2006.01)
*G01F 15/02* (2006.01)
(Continued)

(52) U.S. Cl.
CPC .......... *G01F 1/8436* (2013.01); *G01F 1/8422* (2013.01); *G01F 1/8427* (2013.01);
(Continued)

(58) Field of Classification Search
CPC .... G01F 1/8436; G01F 1/8422; G01F 1/8427; G01F 1/8472; G01F 15/022; G01N 9/002
See application file for complete search history.

(56) References Cited

U.S. PATENT DOCUMENTS 5,027,662 A 7/1991 Titlow et al.
2007/0262814 A1 11/2007 Patten et al.
(Continued)

FOREIGN PATENT DOCUMENTS

CN 101346612 A 1/2009
CN 103052868 A 4/2013
(Continued)

*Primary Examiner* — Nathaniel J Kolb
(74) *Attorney, Agent, or Firm* — Kelly J. Smith; Endress+Hauser (USA) Holding, Inc.

(57) ABSTRACT

A method for operating a Coriolis measurement device comprises the following steps: recording the measured voltages of sensors for sensing measuring tube vibrations and creating an asymmetric sequence of values by way of the amplitudes of the measured voltages for the purpose of diagnosing the Coriolis measurement device, recording at least one stabilization variable and creating a stabilized asymmetric sequence of values based on the stabilization variable, wherein the stabilization variable is one of the following variables or a first or further temporal derivative thereof: a resonant frequency of the measuring tube containing medium or a variable derived therefrom, time or phase difference between measurement signals from the first sensor and the second sensor or a variable derived therefrom, temperature of the measuring tube wall, temperature difference between two measurement points of the measuring tube wall.

12 Claims, 4 Drawing Sheets

(51) Int. Cl.
 *G01F 25/10* (2022.01)
 *G01F 15/06* (2022.01)
(52) U.S. Cl.
 CPC ............ *G01F 15/022* (2013.01); *G01F 25/10* (2022.01); *G01F 1/8477* (2013.01); *G01F 15/06* (2013.01)

(56) References Cited

U.S. PATENT DOCUMENTS

| | | | |
|---|---|---|---|
| 2011/0011186 A1* | 1/2011 | Miyaji | G01F 1/74 73/861.356 |
| 2014/0076035 A1* | 3/2014 | Henry | G01F 1/8486 73/61.43 |
| 2020/0264024 A1* | 8/2020 | Rensing | G01N 9/002 |

FOREIGN PATENT DOCUMENTS

| | | |
|---|---|---|
| CN | 103765168 A | 4/2014 |
| CN | 106461430 A | 2/2017 |
| CN | 106461442 A | 2/2017 |
| DE | 69531026 T2 | 3/2006 |
| DE | 102009000749 A1 | 8/2010 |
| DE | 102016125537 A1 | 7/2018 |
| DE | 102017106209 A1 | 7/2018 |
| WO | 2012016581 A1 | 2/2012 |
| WO | WO-2019040089 A1 * | 2/2019 ............... G01F 1/74 |

* cited by examiner

METHOD FOR OPERATING A CORIOLIS MEASUREMENT DEVICE

CROSS-REFERENCE TO RELATED APPLICATIONS

The present application is related to and claims the priority benefit of DPMA Patent Application No. 10 2020 108 849.3, filed on Mar. 31, 2020, and International Patent Application No. PCT/EP2021/055738, filed Mar. 8, 2021, the entire contents of which are incorporated herein by reference.

TECHNICAL FIELD

The invention relates to a method for operating a Coriolis measurement device for measuring a density and/or a mass flow of a medium flowing through a pipeline.

BACKGROUND

In Coriolis measurement devices, at least one measuring tube is excited to vibrate; see for example DE102016125537A1. A medium flowing through the measuring tube causes characteristic distortions of these vibrations. These vibrations are usually sensed by two sensors and evaluated by an electronic measuring/operating circuit. Due to manufacturing inaccuracies, the sensors are very often slightly asymmetrical in terms of measurement, which means that a low flow is measured at zero flow. This asymmetry can be corrected after an initial calibration of the measurement device. Deviations from this calibration represent a separate measurement variable. However, this measurement variable can be very noisy.

SUMMARY

The object of the invention is therefore to propose a method by means of which the measured values of the measurement variable relating to deviations of the sensor asymmetry from an original state are stabilized.

The present disclosure is described with reference to by-a method according to independent claim 1.

In a method according to the invention for operating a Coriolis measurement device for measuring a density and/or a mass flow of a medium flowing through a pipeline,
  the Coriolis measurement device comprises at least one measuring tube for guiding the medium, each having an inlet and an outlet and a measuring tube wall enclosing a measuring tube lumen;
  at least one exciter for generating measuring tube vibrations, and a first sensor on the inlet side and a second sensor on the outlet side for sensing measuring tube vibrations, wherein the exciter and the sensors each have a coil device with at least one coil and a magnetic device with at least one magnet,
  wherein the coil device and the magnetic device of each sensor are moved relative to one another by measuring tube vibrations, during which an electrical measured voltage is induced in the coil;
  an electronic measuring/operating circuit for operating the exciter, for sensing and evaluating the electrical measured voltages and for outputting measured values of density and/or mass flow and diagnostic information, wherein the method has the following steps:
  recording the measured voltages from the sensors and creating an asymmetric sequence of values by means of the amplitudes of the measured voltages for the purpose of diagnosing the Coriolis measurement device in a first method step,
  recording a measurement signal of at least one stabilization variable in a second method step,
  creating a stabilized asymmetric sequence of values based on the asymmetric sequence of values as a function of the stabilization variable in a third method step,
  wherein the stabilization variable is based on one of the following variables or a first or second temporal derivative thereof:
  a resonant frequency of the measuring tube containing medium or a variable derived therefrom,
  time or phase difference between measurement signals from the first sensor and the second sensor or a variable derived therefrom,
  temperature of the measuring tube wall,
  temperature difference between two measurement points of the measuring tube wall.

The first method step and the second method step can also take place in the reverse order or else simultaneously.

In order to create the asymmetric sequence of values, a ratio of an absolute deviation of amplitudes of the measured voltages from a mean value of the amplitudes of the measured voltages can be formed.

In particular, a temporal mean of absolute values of the first or second temporal derivative of the variables for the stabilization variable can be used.

In one embodiment, a scatter value of the measured values of a stabilization variable is determined, wherein the asymmetry measured value is stabilized by means of the scatter value.

In one embodiment, when a first limit value is exceeded by the scatter value, a last valid value of the asymmetric sequence of values is used as the current value of the asymmetric sequence of values, or the asymmetric sequence of values is set to a predetermined value.

Predetermined values can be, for example, zero or NaN (not a number) or other values which indicate an invalidity of the asymmetric sequence of values at certain times or in certain time ranges. In this way, the electronic measuring/operating circuit can recognize whether values of the asymmetric sequence of values correspond to measured values of the asymmetry, or whether the values are to be ignored with regard to a determination of a Coriolis measurement device state, for example.

In particular in the case of a medium containing multiple medium components, possibly in different states of matter, the asymmetric sequence of values can temporarily deviate greatly from an average value and thus be distorted in a disruptive manner, and therefore a replacement of values of the asymmetric sequence of values by a last valid value or by a predetermined value provides a significantly more stable asymmetric sequence of values.

In one embodiment, a mean value of measured values of a stabilization variable is formed, wherein the first limit value is derived from the scatter value and/or the mean value, or wherein the first limit value is a configured or configurable or predetermined value. The first limit value can be established, for example, via a relative or absolute deviation from a conventional scattering in a single-phase medium or a pure medium.

In one embodiment, the mean value is a moving mean value with a first time window, and wherein the scatter value is a moving scatter value with a second time window.

In this way, the calculation of a mean value and of the scatter value can be adapted to a measurement situation or measurement point, so that the asymmetric sequence of values is stabilized.

In one embodiment, the first time window has a duration of at least 0.2 seconds and in particular at least 0.5 seconds and preferably at least 1 second, and/or the first time window has a duration of at most 90 seconds and in particular at most 70 seconds and preferably at most 60 seconds.

In one embodiment, the second time window has a duration of at least 2 seconds and in particular at least 4 seconds and preferably at least 5 seconds, and/or wherein the second time window has a duration of at most 150 seconds and in particular at most 130 seconds and preferably at most 120 seconds.

In one embodiment, if the time or phase difference or a variable derived therefrom falls below a second limit value and the asymmetry exceeds a third limit value, a last valid measured value of the asymmetric sequence of values is used as the current value of the asymmetric sequence of values, or the asymmetric sequence of values is set to a predetermined value.

In this way, an asymmetry-causing partial filling of the measuring tube when the medium is stationary can be detected and rejected. The second limit value can correspond, for example, to a value of less than 5% and in particular less than 1% and preferably less than 0.1% of a maximum specified mass flow. The third limit value can be, for example, an asymmetry of at least 0.1% and in particular at least 1% and preferably at least 5%.

In one embodiment, the scatter value is determined by one of the following procedures:

summing distances between adjacent measured values, summing distances of the measured values from a mean value of measured values of the stabilization variable.

In one embodiment, a distance measure A has the following relationship:

$A = |p1-p2|^n$, where n>0, and p1 is a measured value and p2 is a measured value or a mean value.

Preferably, n is a number greater than 0.5 and at most 4. It is not ruled out here that the relationship has further terms or is modified by means of a factor.

In one embodiment, a warning is output if an amount of the stabilized asymmetric sequence of values exceeds a limit value.

DETAILED DESCRIPTION

Figure 1:
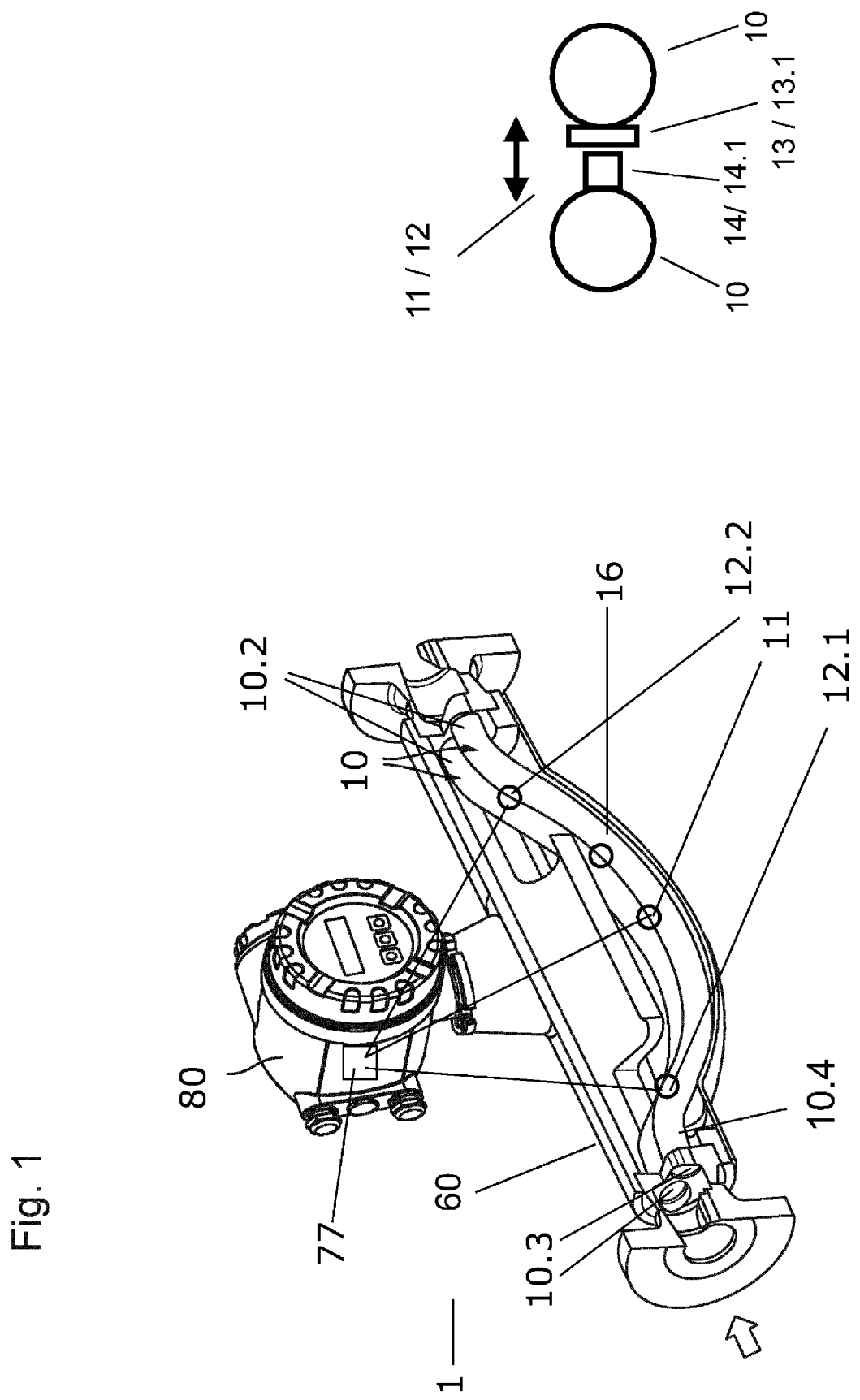
FIG. 1 describes an exemplary Coriolis measurement device.

FIG. 1 shows an exemplary Coriolis measurement device 1 for measuring a mass flow or a density of a medium flowing through a pipeline, comprising two measuring tubes 10, each having an inlet 10.1 and an outlet 10.2, wherein a measuring tube wall 10.4 encloses a measuring tube lumen 10.3. The measuring tubes are excited to vibrate by an exciter 11; a first sensor 12.1 on the inlet side and a second sensor 12.2 on the outlet side sense the measuring tube vibrations and generate measurement signals, which are evaluated by an electronic measuring/operating circuit 77 arranged in a housing 80. The measuring tubes are held by a supporting element. As shown here, the sensor and the exciter can each have a coil device 13 with a coil 13.1 and a magnetic device 14 with a magnet 14.1, wherein the coil device and the magnetic device experience relative movements as a result of measuring tube vibrations. As a result of the relative movement, electrical voltages are induced in the coil, and electrical currents are thus caused, which are processed by the electronic measuring/operating circuit. The measurement signal can be the electrical voltage or the electrical current. Since inaccuracies in production and manufacturing exist also in Coriolis measurement devices, different sensors are not exactly the same, and therefore they produce slightly different measurement signals under the same conditions, which manifests, for example, in different amplitudes of measurement signals. This asymmetry between the sensors can be used as a further measurement variable in order to be able to detect, for example, an operating state or a wear state of the Coriolis measurement device. As indicated here, Coriolis measurement devices can also have at least one temperature sensor 16, which sense the temperature of the measuring tube wall.

Coriolis measurement devices can also have only one measuring tube or more than two measuring tubes. A person skilled in the art will then adapt the exciter and the sensors accordingly. Thus, it is not necessary for the coil device and the magnetic device to each be arranged on one measuring tube, but they can, for example, also be fastened to the supporting element via a holding device. Coriolis measurement devices can also have more than one exciter and/or more than two sensors.

Figure 2:
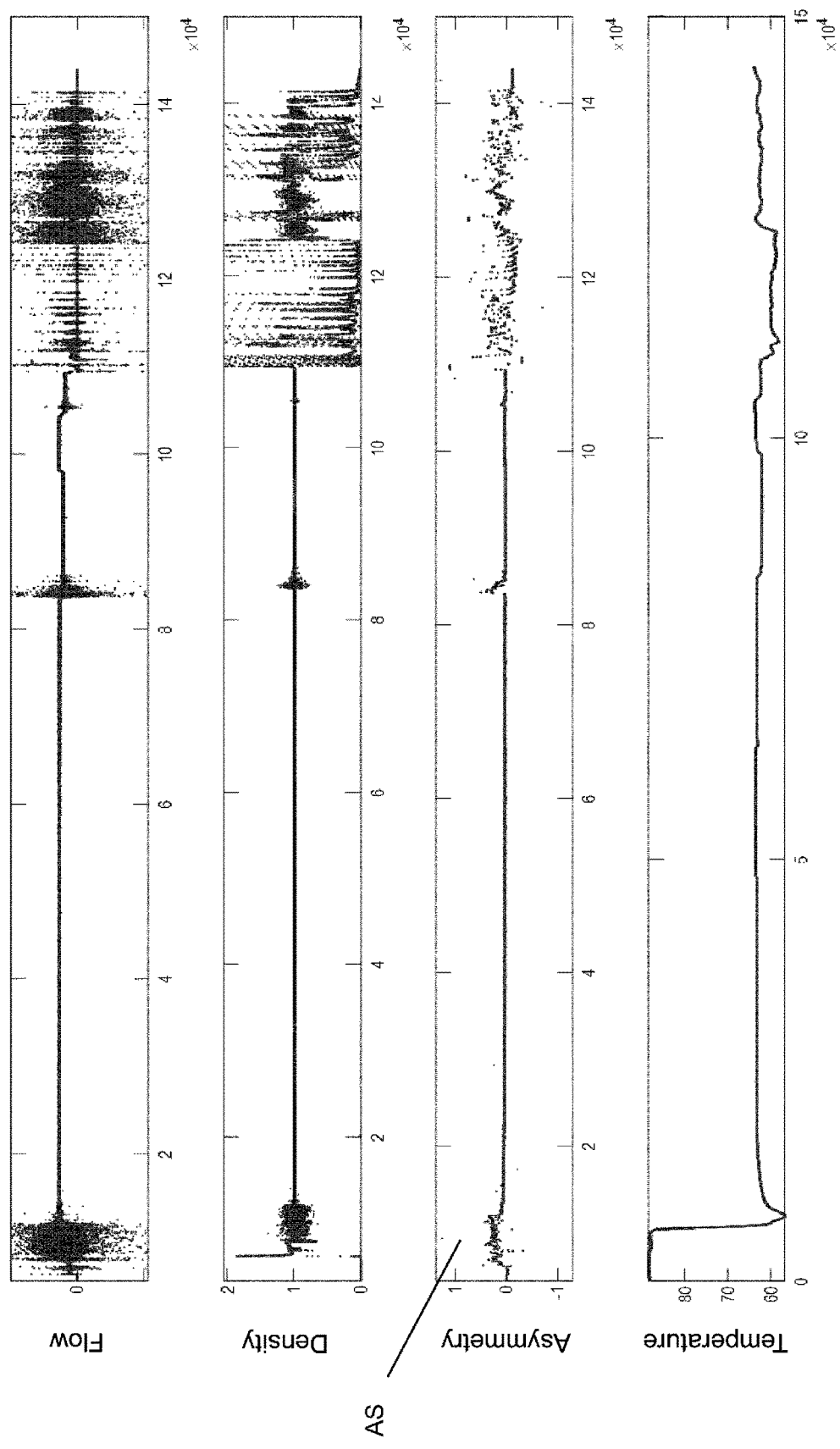
FIG. 2 shows exemplary curves of measurement signals.

FIG. 2 illustrates exemplary curves of measurement signals relating to mass flow, density, asymmetry of the sensors and a temperature of the measuring tube wall. The scaling of the axes is given in arbitrary units and purely by way of example. In the case of homogeneous medium, the curve of measured density and measured flow is usually less variable. In the case of a medium having different immiscible or poorly miscible fractions and/or fractions with different states of matter, short-term signal fluctuations which start and stop suddenly can occur, as shown in the exemplary measurement signal curves. These are due to the fact that local fluctuations in the medium composition in the region of the sensors influence the measuring tubes in the region of the sensors in different ways. During such phases, the asymmetric sequence of values AS cannot be used.

Figure 3:
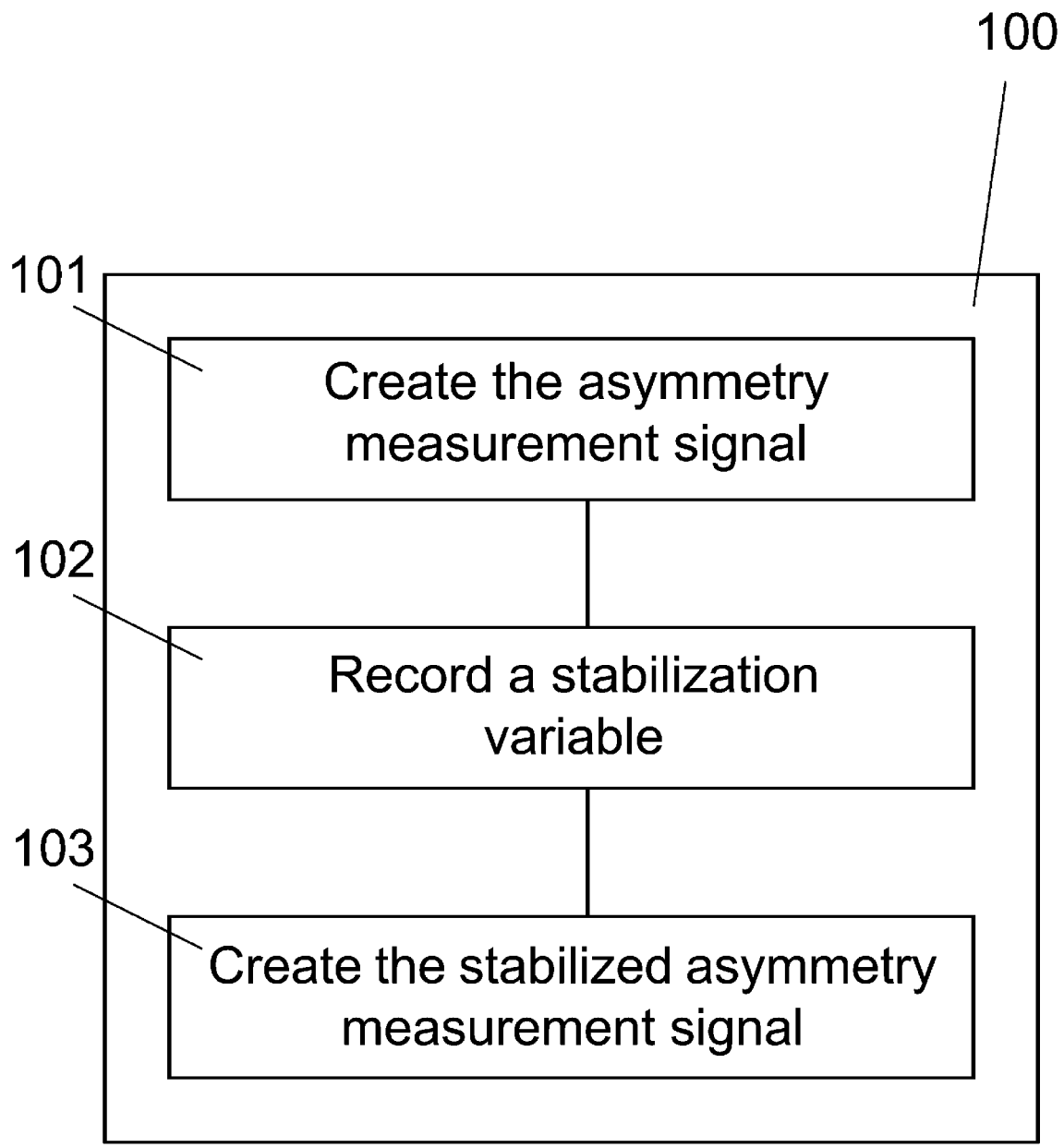
FIG. 3 illustrates the sequence of a method according to the present disclosure.

FIG. 3 describes the sequence of an exemplary method according to the invention for stabilizing the asymmetric sequence of values.

In a first method step 101, an asymmetric sequence of values AS is created from the measurement signals from the sensors 12.1 and 12.2, wherein, for example, amplitudes of the measurement signals from the sensors are used.

In a second method step 102, a measurement signal of at least one stabilization variable is recorded, which measurement signal is used to determine a validity of the asymmetric sequence of values.

In a third method step 103, the asymmetric sequence of values is stabilized by means of the stabilization variable, and an asymmetric sequence of values SAS is formed.

The first method step and the second method step can also be carried out in the reverse order or else simultaneously. The order of the method steps is limited only by causality. The stabilization variable is one of the following variables or a first or further temporal derivative thereof:

a resonant frequency of the measuring tube containing medium or a variable derived therefrom, such as density of the medium, time or phase difference between measurement signals from the first sensor and the second sensor or a variable derived therefrom, such as mass flow, temperature of the measuring tube wall, temperature difference between two measurement points of the measuring tube wall.

For example, a scattering of the measurement signal of the stabilization variable is determined, and when a first limit value is exceeded by the scatter value, a last valid measured value of the asymmetric sequence of values is used as the current value of the asymmetry measured value, or the asymmetric sequence of values is set to a predetermined value. In this way, the asymmetric sequence of values can be prepared such that, for example, it can be interpreted and processed by the electronic measuring/operating circuit in a meaningful manner. Typical values for a predetermined value are, for example, NaN (not a number), 0, or a value outside a typical value range of the asymmetric sequence of values, such as 1000. This is what stabilizing the asymmetric sequence of values means. The first limit value can be derived from scatter values of the measured values of the stabilization variable and/or from a mean value of measured values of the stabilization variable. When the first limit value is derived, the mean value M can be a moving mean value with a first time window Z1, and the scatter value S can be a moving scatter value with a second time window Z2, which time windows are applied to the associated measurement signal. For example, a relative or absolute minimum deviation from the mean value can be defined as a first limit value. A sum of distances between adjacent measured values within the time window Z2 can be formed in order to calculate the scattering. A sum of distances of measured values from the mean value within the time window Z2 can also be formed in order to calculate the scattering, wherein the mean value is formed from measured values within a time window Z1.

For example, the first time window Z1 has a duration of at least 0.2 seconds and in particular at least 0.5 seconds and preferably at least 1 second, and/or wherein the first time window has a duration of at most 90 seconds and in particular at most 70 seconds and preferably at most 60 seconds. For example, the second time window Z2 has a duration of at least 2 seconds and in particular at least 4 seconds and preferably at least 5 seconds, and/or wherein the second time window has a duration of at most 150 seconds and in particular at most 130 seconds and preferably at most 120 seconds. It is not ruled out that the first time window and the second time window are identical.

The following relationship can be used as the distance measure A: $A=|p1-p2|^n$, where $n>0$, and p1 is a measured value and p2 is a measured value or a mean value.

Another reason for invalid measured values of the asymmetric sequence of values can be only partial filling of the at least one measuring tube of the Coriolis measurement device. In this case, the amplitudes of the measurement signals from the sensors can deviate greatly from one another. An only partial filling can take place, for example, if the at least one measuring tube is oriented vertically, when a liquid level of the measuring tube falls to a level between the first sensor and the second sensor due to lack of flow. This can be detected by checking the time or phase difference or a variable derived therefrom and the asymmetric sequence of values.

If the time or phase difference or a variable derived therefrom falls below a second limit value, and the asymmetry exceeds a third limit value, then a partial filling is detected, and a last valid measured value of the asymmetric sequence of values is used as the current value of the asymmetric sequence of values, or the asymmetric sequence of values is set to a predetermined value.

Figure 4:
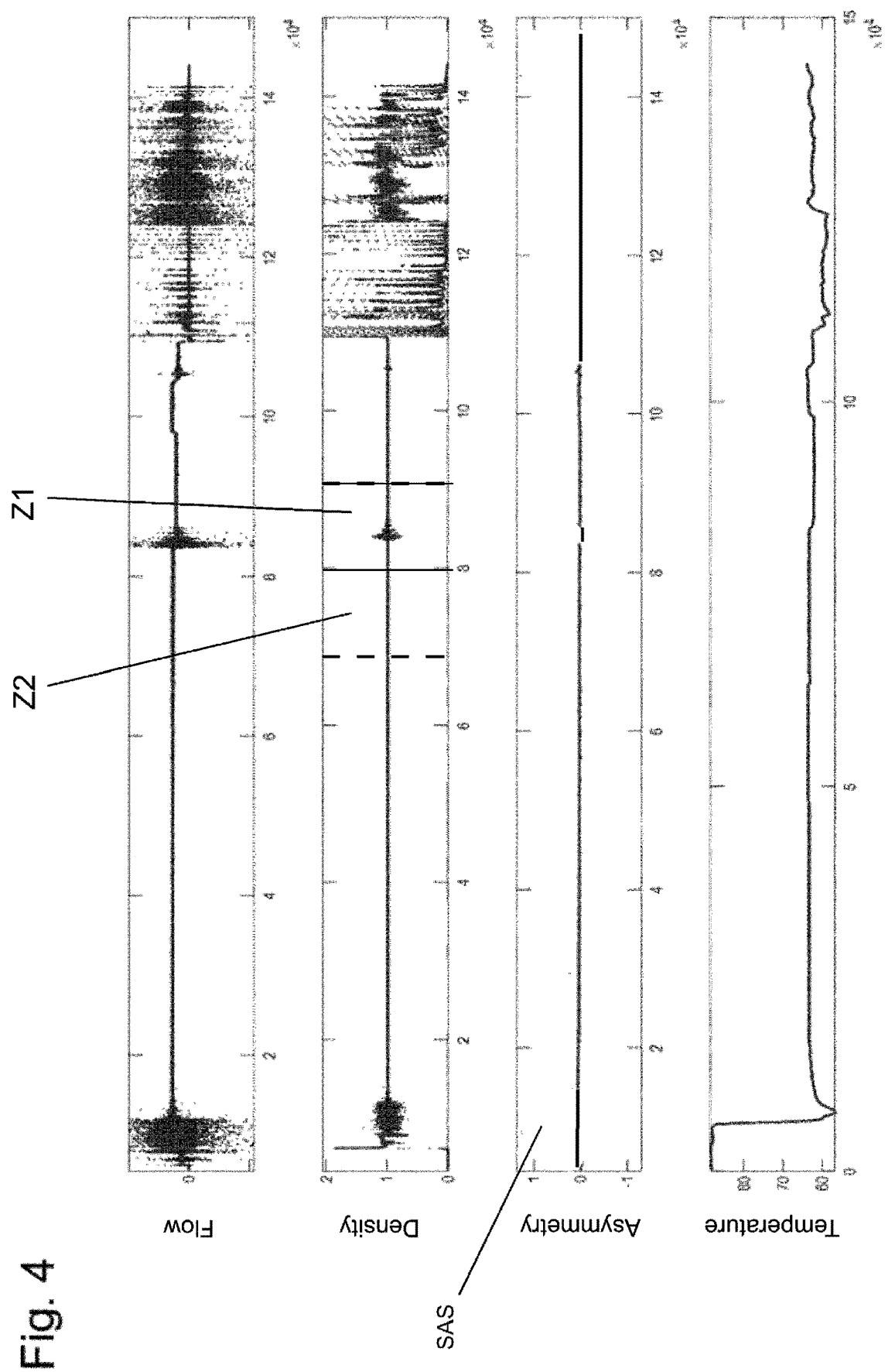
FIG. 4 illustrates the curve of a stabilized asymmetric sequence of values.

FIG. 4 illustrates exemplary curves of measurement signals relating to mass flow, density, asymmetry of the sensors and a temperature of the measuring tube wall, wherein the asymmetric sequence of values is now a stabilized asymmetric sequence of values SAS. By way of example, a time window Z1 (solid lines) and a time window Z2 (dashed lines) are illustrated in the curve of the measured values of the density of a medium, which are applied to the measurement signal of the density at a point in time and are carried along at a current point in time. As a result of the procedure described further above, invalid measured values of the asymmetric sequence of values can be detected and marked or corrected.

In general, a warning can be output if an amount of the stabilized asymmetric sequence of values SAS exceeds a fourth limit value G4. In this case, a deterioration of a measurement system state can be present, which can result in repair or replacement of the Coriolis measurement device. The fourth limit value can be, for example, an asymmetry of at least 0.1% and in particular at least 1% and preferably at least 5%.

The invention claimed is:

1. A method for operating a Coriolis measurement device for measuring a density or a mass flow of a medium flowing through a pipeline,
   wherein the Coriolis measurement device comprises:
   at least one measuring tube for guiding the medium, each having an inlet and an outlet and a measuring tube wall enclosing a measuring tube lumen;
   at least one exciter for generating measuring tube vibrations, and a first sensor on the inlet side and a second sensor on the outlet side for sensing measuring tube vibrations, wherein the exciter and the sensors each have a coil device with at least one coil and a magnetic device with at least one magnet;
   wherein the coil device and the magnetic device of each sensor are moved relative to one another by measuring tube vibrations, during which an electrical measured voltage is induced in the coil; and
   an electronic circuit for operating the exciter, for sensing and evaluating the electrical measured voltages and for outputting diagnostic information, and for outputting measured values of density or mass flow;
   wherein the method has the following steps:
   diagnosing the Coriolis measurement device by:
      recording the measured voltages from the sensors and creating a first sequence of values using the amplitudes of the measured voltages, wherein the first sequence of values represents differences between amplitudes of signals of at least two different sensors;
      recording a measurement signal of at least one stabilization variable;
      creating a second sequence of values based on the first sequence of values as a function of the stabilization variable;
      wherein the stabilization variable is based on one of the following variables or a first or second temporal derivative thereof:

a resonant frequency of the measuring tube containing medium or a variable derived therefrom;

time or phase difference between measurement signals from the first sensor and the second sensor or a variable derived therefrom;

temperature of the measuring tube wall; or temperature difference between two measurement points of the measuring tube wall; and outputting error information if a value in the second sequence of values is greater than a predetermined value.

2. The method according to claim 1, wherein a scatter value of the measured values of the stabilization variable is determined, wherein the first sequence of values is stabilized using the scatter value;

wherein the scatter value is based on a random number of values.

3. The method according to claim 2, wherein, when a first limit value is exceeded by the scatter value a last valid measured value of the first sequence of values is used as the current value of the first sequence of values; or the first sequence of values is set to a predetermined value.

4. The method according to claim 3, wherein the first limit value is derived from scatter values or a mean value of measured values of the stabilization variable; or wherein the first limit value is a configurable parameter.

5. The method according to claim 4, wherein the mean value is a moving mean value with a first time window, and wherein the scatter value is a moving scatter value with a second time window;

wherein the moving mean value changes with time;

wherein the moving scatter value changes with time.

6. The method according to claim 5, wherein the first time window has a duration of at least 0.2 seconds and at most 90 seconds.

7. The method according to claim 6, wherein the second time window has a duration of at least 2 seconds and at most 150 seconds.

8. The method according to claim 3, wherein, if the time or phase difference or a variable derived therefrom falls below a second limit value and the asymmetry exceeds a third limit value, a last valid measured value of the asymmetric sequence of values is used as the current value of the asymmetric sequence of values, or the asymmetric sequence of values is set to a predetermined value.

9. The method according to claim 2, wherein the scatter value is determined by one of the following procedures:

summing differences between adjacent measured values, summing differences of the measured values from a mean value of measured values of the stabilization variable.

10. The method according to claim 9, wherein a distance measure A has the following relationship:

$A = |p1 - p2|^n$, where $n > 0$, and p1 is a measured value and p2 is a measured value or a mean of the measured value.

11. The method according to claim 8, wherein a warning is output if an amount of the stabilized asymmetric sequence of values exceeds a fourth limit value.

12. The method according to claim 1, wherein the Coriolis measurement device comprises at least one temperature sensor.

* * * * *